United States Patent [19]
Griggs, III et al.

[11] Patent Number: 5,954,360
[45] Date of Patent: Sep. 21, 1999

[54] VEHICLE OCCUPANT SENSING APPARATUS AND METHOD

[75] Inventors: James Woodhouse Griggs, III, Bradenton; Robert Perry Pettypiece, Jr., Lakeland, both of Fla.

[73] Assignee: Breed Automotive Technology, Inc., Lakeland, Fla.

[21] Appl. No.: 08/933,596

[22] Filed: Sep. 18, 1997

[51] Int. Cl.⁶ .................................................. B60R 21/32
[52] U.S. Cl. ........................... 280/735; 180/268; 701/46; 701/47
[58] Field of Search ............................ 280/735; 180/268, 180/271, 273; 701/45, 46, 47

[56] References Cited

U.S. PATENT DOCUMENTS

| | | | |
|---|---|---|---|
| 5,330,226 | 7/1994 | Gentry et al. | 280/735 |
| 5,366,241 | 11/1994 | Kithil | 280/735 |
| 5,398,185 | 3/1995 | Omura | 180/268 |
| 5,454,591 | 10/1995 | Mazur et al. | 280/735 |
| 5,490,069 | 2/1996 | Giotusos et al. | 280/735 X |
| 5,605,348 | 2/1997 | Blackburn et al. | 280/735 |
| 5,626,359 | 5/1997 | Steffens, Jr. et al. | 280/735 |
| 5,636,864 | 6/1997 | Hori | 280/735 |
| 5,653,462 | 8/1997 | Breed et al. | 280/735 |
| 5,782,485 | 7/1998 | Takeda et al. | 280/735 |
| 5,845,000 | 12/1998 | Breed et al. | 382/100 |
| 5,848,802 | 12/1998 | Breed et al. | 280/735 |

*Primary Examiner*—Christopher P. Ellis
*Attorney, Agent, or Firm*—Lonnie Drayer; Roger Emerson

[57] ABSTRACT

A vehicle occupant sensing apparatus is provided for use with an associated vehicle having a seat. The vehicle occupant sensing apparatus includes a first range measurement system for sensing a first distance from the first range measurement system towards a first area of the seat, a second range measurement system for sensing a second distance from the second range measurement system toward a second area of the seat and a controller. The controller includes operating means for operating the first and second range measurement systems and determining means for determining if an object is located on the seat in response to the first and second distances. In this way it can be determined if a child seat is present on the seat of the associated vehicle and further whether it is a front facing or back facing child seat.

6 Claims, 5 Drawing Sheets

VEHICLE OCCUPANT SENSING APPARATUS AND METHOD

BACKGROUND OF THE INVENTION

1. Field of Invention

This invention pertains to the art of methods and apparatuses for occupant restraint assemblies, and more specifically to methods and apparatuses for a vehicle occupant sensing apparatus.

2. Description of the Related Art

It is well known to provide occupant restraint assemblies for vehicles, such as passenger cars, to restrain an occupant during a crash. Typically, an occupant restraint assembly includes an airbag and an inflator for inflating the airbag. When a crash is sensed by some type of crash sensor, typically mounted to the vehicle, the airbag is deployed, that is inflated with a gas. The inflated airbag then restrains the motion of the occupant during the crash. Preferably, the airbag may be deployed at varying deployment conditions depending on the occupant's size and location. A properly positioned adult, for example, may require that the airbag be deployed at full or "normal" strength. When no occupant is present, it is typically better to prevent the airbag from deploying at all.

A common problem known in the art relates to the use of an occupant restraint assembly with a child seat. Child seats are used to restrain smaller occupants, such as small children and infants. Child seats commonly come in two types, front facing and back facing. A front facing child seat is a child seat in which both the child seat and the occupant within the child seat face toward the front of the vehicle. Similarly, a back facing child seat is a child seat in which both the child seat and the occupant within the child seat face toward the back of the vehicle. It is currently an accepted standard in the art that in cases where a back facing child seat is present an associated airbag should not be deployed. In cases where a front facing child seat is present, on the other hand, it may be desirable to deploy the airbag either at full strength or at a reduced strength. What is needed then, is a reliable apparatus and method for sensing the presence of a child seat and whether it is front facing or back facing.

Another problem known in the art relates to the use of ultrasonic devices. Ultrasonic devices transmit and receive waves having a frequency above the human ear's audible limit in order to sense the distance between an object and the ultrasonic device. In the art of occupant restraint assemblies, it is know to use ultrasonic devices to sense the distance between the ultrasonic device and an object, such as an occupant, positioned on the seat of a vehicle. Such ultrasonic devices are known to emit a "clicking" sound that may be considered annoying by vehicle occupants. Therefore, a method and apparatus for reducing or eliminating such clicking sounds is desirable.

The present invention provides methods and apparatuses for determining the presence of an object, such as an occupant, in a vehicle. It also determines the presence of a child seat and whether the child seat is front facing or rear facing. In addition, the present invention provides methods and apparatuses for reducing the clicking sounds known with the use of ultrasonic devices. The difficulties inherent in the art, are therefore overcome in a way that is simple and efficient, while providing better and more advantageous results.

SUMMARY OF THE INVENTION

According to one aspect of the present invention, there is provided a vehicle occupant sensing apparatus for use with an associated vehicle that has a seat that may have a child seat thereon. The vehicle occupant sensing apparatus includes a first range measurement system for sensing a first distance from the first range measurement system towards a first area of the seat, a second range measurement system for sensing a second distance from the second range measurement system toward a second area of the seat and a controller. The controller includes operating means for operating the first and second range measurement systems and determining means for determining if an object is located on the seat in response to the first and second distances. In this way it can be determined if a child seat is present on the seat of the associated vehicle and further whether it is a front facing or back facing child seat.

According to another aspect of the present invention, the operating means of the controller includes first pulse rate operating means for operating the range measurement systems at first pulse rates and second pulse rate operating means for operating the range measurement systems at second pulse rates. The operating means selectively switches from the first pulse rate operating means to the second pulse rate operating means in response to the first and second distances that were determined by the first pulse rate operating means. In this way, the pulse rate of the operation of the ultrasonic devices can be reduced thereby reducing the clicking sounds known to occur with ultrasonic devices.

According to another aspect of the present invention, there is provided a method for determining the presence of a child seat in an associated vehicle that has a seat. The method includes the steps of sensing a first distance from a first range measurement system toward a first area of the seat, sensing a second distance from a second range measurement system toward a second area of the seat, and determining if a child seat is located on the seat in response to the first and second distances.

According to still another aspect of the present invention, the method for determining the presence of a child seat in an associated vehicle further includes the steps of determining if the first distance is within the range of an empty seat value and a head height value, determining if the second distance is within the range of the empty seat value and the head height value and determining a distance ratio wherein the distance ratio equals the first distance divided by the second distance. In this way it can be determined if the child seat is front facing or back facing.

One advantage of the present invention is that it can determine whether a child seat is present on the seat of an associated vehicle.

Another advantage of the present invention is that it can be determined if the child seat is front facing or back facing.

Another advantage of the present invention is that the clicking sound known to occur with the use of ultrasonic devices can be significantly reduced.

Another advantage of the present invention is that it can be easily assembled and reliably operated.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
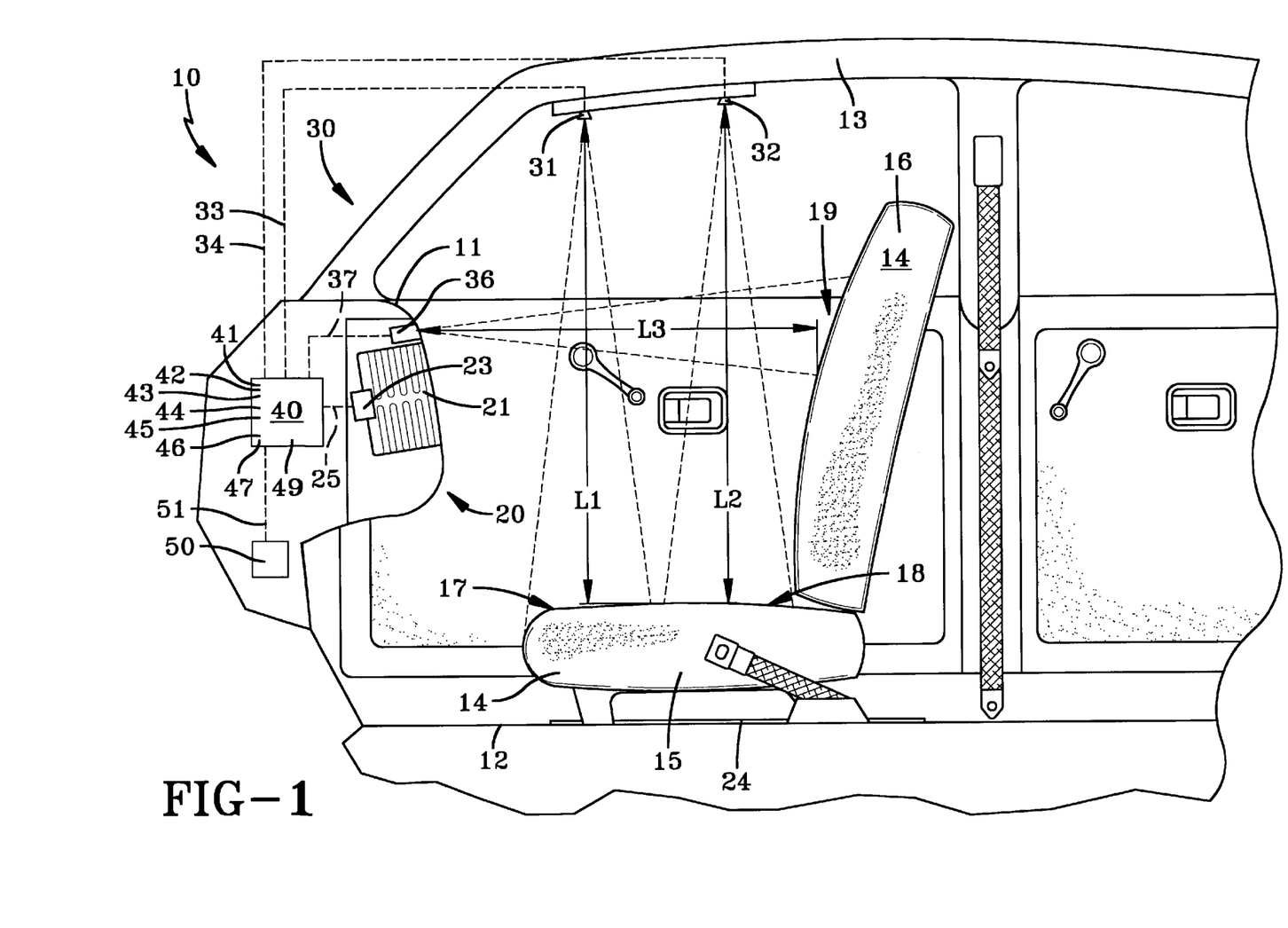
FIG. 1 is a schematic diagram of an occupant restraint assembly within a vehicle showing the vehicle occupant sensing apparatus of this invention when no objects or occupants are present.

Referring now to the drawings wherein the showings are for purposes of illustrating a preferred embodiment of the invention only and not for purposes of limiting the same, FIG. 1 shows the inside of a vehicle 10 with an occupant restraint assembly 20 that is equipped with the present invention, a vehicle occupant sensing apparatus 30. Although the embodiments shown herein concern the front seat of a passenger car, it is to be understood that this invention is applicable to any seat in any vehicle and other applications as well. It should also be understood that the vehicle occupant sensing apparatus 30 of this invention works with any type of occupant restraint assembly such as an airbag or seat belt pretensioner or may be used without an occupant restraint assembly. The vehicle 10 includes an instrument panel 11, a base 12 and a top 13. The vehicle 10 also includes a seat 14 that has a seat cushion portion 15 and a back rest portion 16. The seat 14 is connected to the base 12 of the vehicle 10 in any manner currently known in the art. Thus, the vehicle occupant sensing apparatus 30 of this invention is applicable when the seat 14 is adjustably connected to the base 12. For example, the seat 14 can be moved along rails 24 as is commonly known in the art.

With continuing reference to FIG. 1, the occupant restraint assembly 20 includes an airbag 21 and an inflator 23 that is used to inflate the airbag 21. The airbag 21 in this exemplary embodiment is located within the instrument panel 11 of the vehicle 10. The precise operation of the airbag 21 and the inflator 23 is known in the art and therefore will not be discussed in detail.

With continuing reference to FIG. 1, the vehicle occupant sensing apparatus 30 of this invention includes first and second range measurement systems 31, 32 and a controller 40. Preferably, but alternately, the vehicle occupant sensing apparatus 30 also includes a third range measurement system 36. The first range measurement system 31 senses a first distance L1 from the first range measurement system 31 toward a first area 17 of the seat 14. Similarly, the second range measurement system 32 senses a second distance L2 from the second range measurement system 32 toward a second area 18 of the seat 14 and the third range measurement system 36 senses a third distance L3 from the third range measurement system 36 toward a third area 19 of the seat 14. In the preferred embodiment, the first and second range measurement systems are located above the first and second areas 17, 18 of the seat cushion portion 15 of the seat 14 and the third range measurement system 36 is located on the instrument panel 11 transverse to the back rest portion 16 of the seat 14. In other words, it is preferred that the first and second range measurement systems 31, 32 are used to determine distances in a substantially vertical direction and that the third range measurement system 36 is used to determine distances in a substantially horizontal direction.

Still referring to FIG. 1, the first, second and third range measurement systems 31, 32, 36 are interfaced with the controller 40. This is shown schematically by first, second and third measurement system interfaces 33, 34, 37. The controller 40 can be of any type chosen with sound engineering judgment that operates as discussed herein, such as an application specific integrated circuit (ASIC), a microprocessor, a microcontroller, or a combination of suitable electronic components. The controller 40 includes operating means 41 for operating the first, second and third range measurements systems 31, 32, 36 and determining means 44 for determining if an object (not shown in FIG. 1) is located on the seat 14 based on the distances sensed by the first, second and third range measurements systems 31, 32, 36. When the occupant restraint assembly 20 is used with this invention, it is preferred that the controller 40 has the capability to vary the operation of the deployment of the airbag 21. Thus, a deployment interface 25 operatively connects the controller 40 to the inflator 23. The operation of the occupant restraint assembly 20 may be varied by any adjusting means 49 known in the art such as by disabling the inflator 23, varying the timing of the beginning of deployment, deploying more than one inflator and/or venting the gas (not shown) from the inflator 23 prior to its entry in the airbag 21. In the preferred embodiment, a crash sensor 50 is operatively connected to the controller 40 via a crash sensor interface 51. The crash sensor 50 can be of any type currently known in the art used in sensing a crash and therefor the need to deploy the airbag 21.

Figure 3:
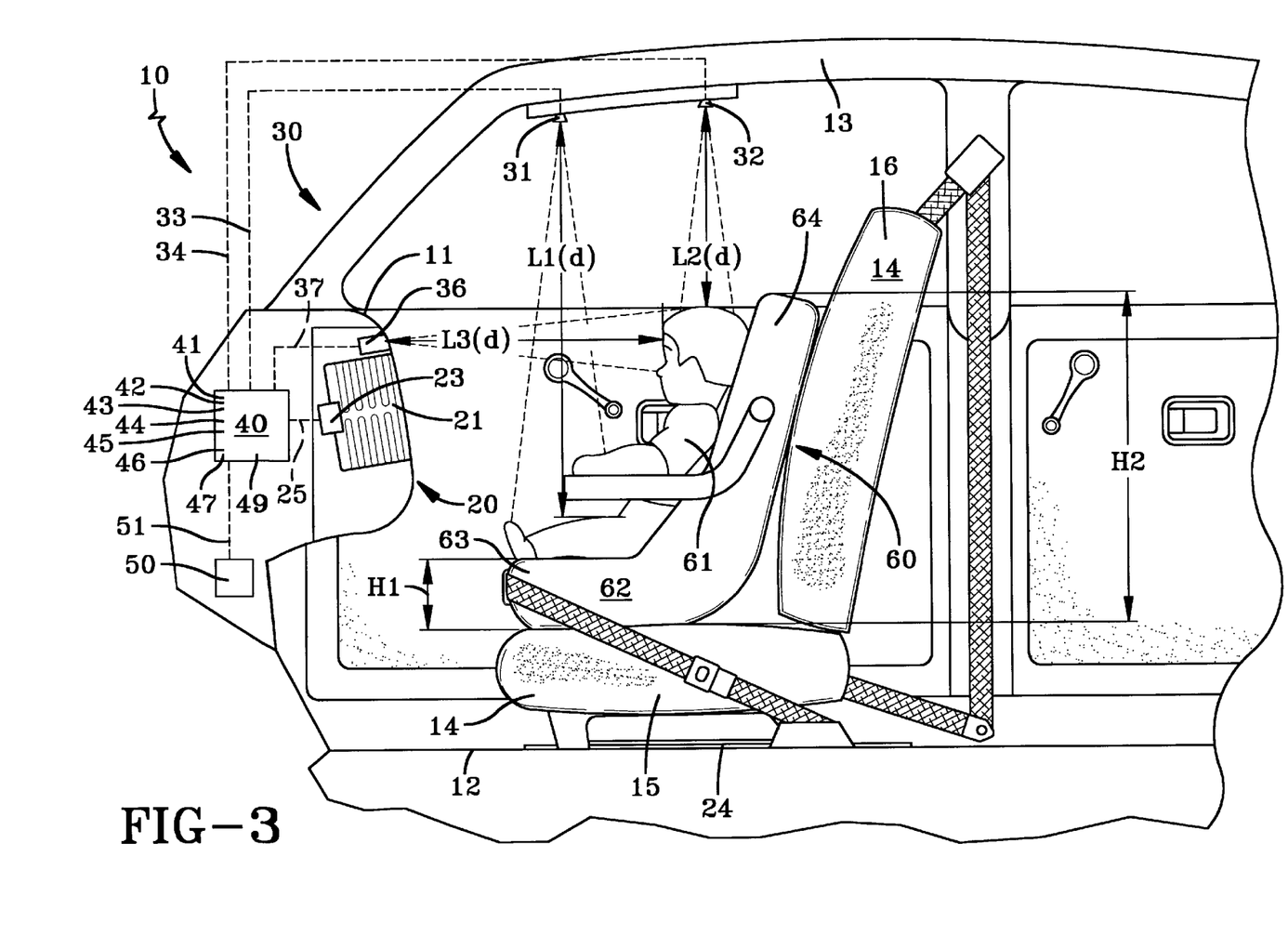
FIG. 3 is a schematic diagram similar to that shown in FIG. 1 but showing the vehicle occupant sensing apparatus of this invention with a front facing child seat on the seat of the vehicle.
Figure 4:
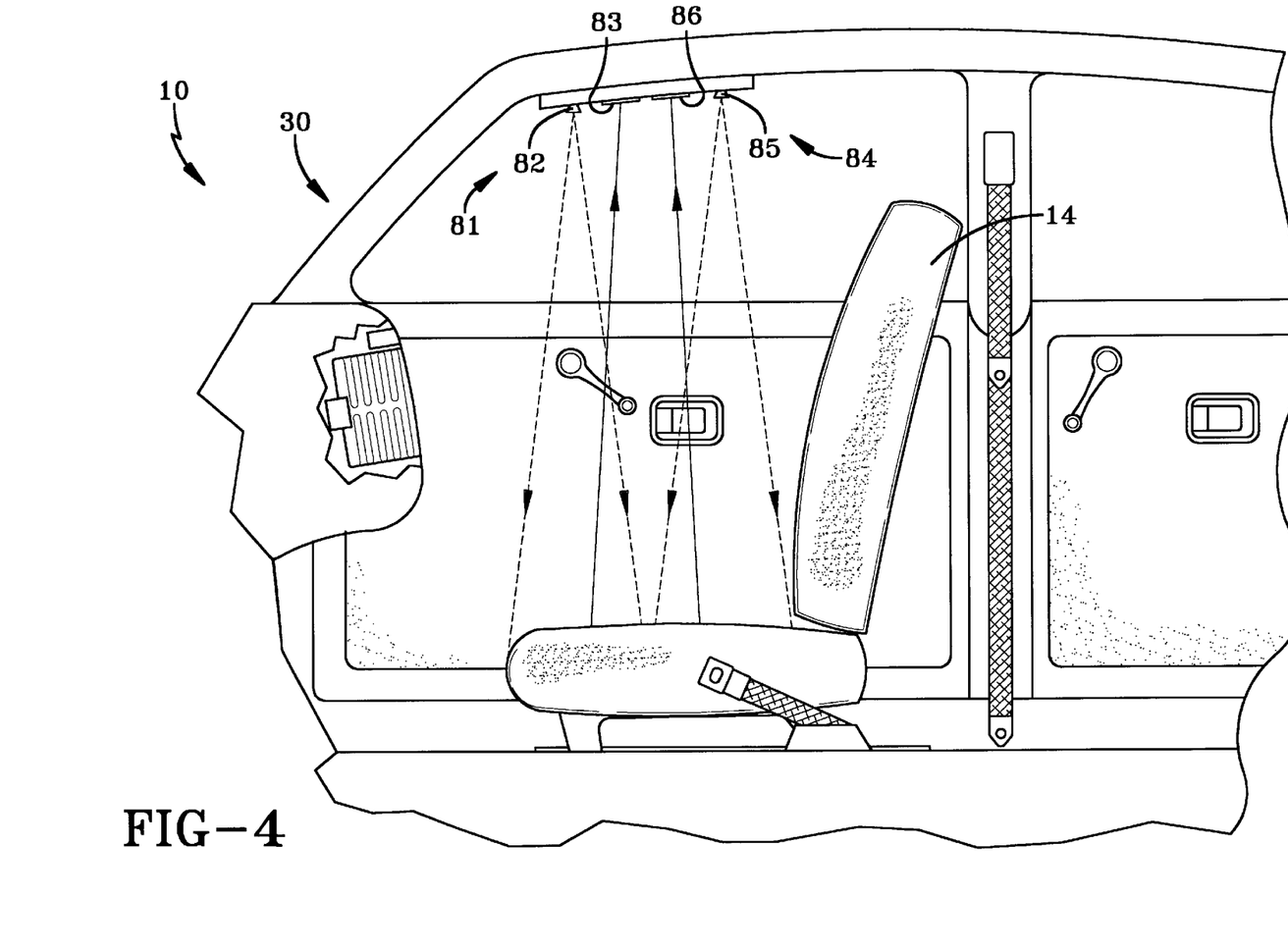
FIG. 4 is a schematic diagram similar to that shown in FIG. 1 but showing ultrasonic range measurement systems that include independent transmitters and receivers.

With reference now to FIGS. 1 and 4, the first, second, and third range measurement systems 31, 32, 36 can be devices of any type chosen with sound engineering judgment such as infrared devices, microwave devices, radio wave generating devices and other types as well. In the preferred embodiment, the first, second, and third range measurement systems 31, 32, 36 comprise ultrasonic devices. The ultrasonic devices can be of any type chosen with sound engineering judgment but, in a prototype the devices employed, are Polaroid ultrasonic transducers/range modules, series 6500, part no. 615077. It is further preferred that the first, second and third range measurement systems, 31, 32, 36, shown in FIGS. 1–5, transmit waves that spread out into a conical pattern toward the seat 14 of the vehicle 10. The conical patterns are shown with dashed lines in the figures. In one embodiment of this invention, shown in FIG. 1, the first, second and third range measurement systems 31, 32, 36 are ultrasonic devices that include a combination transmitter/receiver. This minimizes the number of components for this invention. However, in an alternate embodiment shown in FIG. 4, first and second range measurement systems 81, 82 include independent transmitters 82, 85 respectively and receivers 83, 86 respectively. In all other ways, the operation of the first and second range measurement systems 81, 84 of this embodiment operate as the first and second range measurement systems 31, 32 shown in FIG. 1 and discussed above.

Referring now to FIG. 1, the operation of the vehicle occupant sensing apparatus 30 will first be discussed in general terms. Then, more detail and examples will be provided below. Once the vehicle 10 is started, the operating means 41 of the controller 40 causes the first, second and third range measurement systems, 31, 32, 36 to begin transmitting ultrasonic waves toward the seat 14 as described above. As the ultrasonic waves return, the first, second and third distances L1, L2, L3 between any object or occupant on the seat 14 and the first, second and third range measurement systems, 31, 32, 36 can be sensed. The adjusting means 49 of the controller 40 can then adjust the occupant restraint assembly 20 accordingly in preparation for an impending crash should a crash be sensed by the crash sensor 50. In the preferred embodiment, the determining means 44 of the controller 40 includes third distance determining means 47 for determining if the third distance L3 is less than a predetermined value. The predetermined value can be any distance chosen with sound engineering judgment that would establish that an object or an occupant is too close to the instrument panel 11 for the airbag 21 to be properly deployed. The exact predetermined value may vary but for illustrative purposes only it may be, for example, 15 centimeters.

Still referring to FIG. 1, in the preferred embodiment, the determining means 44 of the controller 40 also includes first and second distance determining means 45, 46 for determining if the first and second distances L1, L2 are within the range of an empty seat value and a head height value. The empty seat value can be any distance chosen with sound engineering judgment that would establish that the seat is empty, that is no object or occupant is present. The exact empty seat value will depend on the vehicle being used but for illustrative purposes only it may be, for example, 90 centimeters. Similarly, the head height value can be any distance chosen with sound engineering judgment that would establish that on object or an occupant is present and that if it is an occupant, the occupant is not a small child. This value is called a head height value because if an occupant is present, the head of the occupant would be sensed first. The exact head height value will depend on the vehicle being used but for illustrative purposes only it may be, for example, 60 centimeters.

With continuing reference to FIG. 1, the operation of the vehicle occupant sensing apparatus 30 will now be discussed in the case when no object or occupant is present on the seat 14 of the vehicle 10. Once the vehicle 10 is started, the operating means 41 of the controller 40 causes the first, second and third range measurement systems, 31, 32, 36 to begin transmitting ultrasonic waves toward the seat 14. As the ultrasonic waves return, the first, second and third distances L1, L2, L3 are sensed. In this case, the third distance determining means 47 would determine that the third distance L3 is not less than a predetermined value. In other words, no object or occupant is too close to the instrument panel 11 for the airbag 21 to be properly deployed. The first and second distance determining means 45, 46 would determine that the first and second distances L1, L2 are equal or greater than the empty seat value. In other words, no object or occupant is present. Thus, in this case, the adjusting means 49 would preferably disable the inflator 23 so that the airbag 21 cannot be deployed. There is no need to deploy the airbag 21 when no occupant is present in the seat 14.

Figure 5:
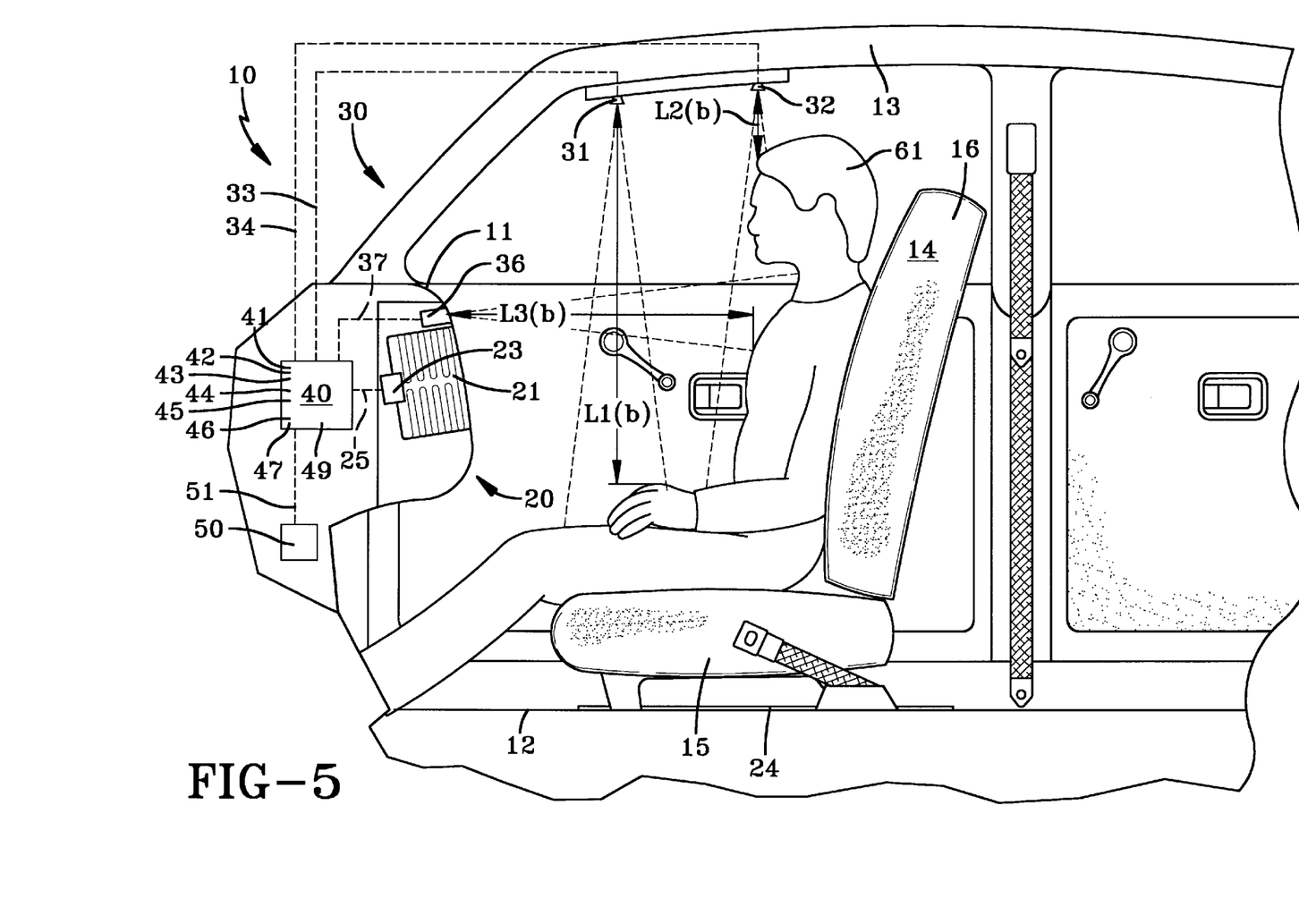
FIG. 5 is a schematic diagram similar to that shown in FIG. 1 but showing the vehicle occupant sensing apparatus of this invention with an adult on the seat of the vehicle.

With reference now to FIG. 5, the operation of the vehicle occupant sensing apparatus 30 will now be discussed in the case when an occupant 61 that is an adult is present on the seat 14 of the vehicle 10. By adult it is meant any occupant that is of sufficient size to require the normal or full deployment strength for the airbag 21. Once the vehicle 10 is started, the operating means 41 of the controller 40 causes the first, second and third range measurement systems, 31, 32, 36 to begin transmitting ultrasonic waves toward the seat 14. As the ultrasonic waves return, the first, second and third distances L1(b), L2(b), L3(b) are sensed. In this case, the third distance determining means 47 would determine that the third distance L3(b) is not less than a predetermined value. In other words, the occupant 61 is not too close to the instrument panel 11 for the airbag 21 to be properly deployed. The first distance determining means 45 would determine that the first distance L1(b) is within the range of the empty seat value and the head height value. The second distance determining means 46, on the other hand, would determine that the second distance L2(b) is equal to or less than the head height value. In other words, the first and second determining means 45, 46 would determine that the occupant 61 is present and positioned in a "normal" position, that is leaning against the back rest portion 16 of the seat 14. Thus, in this case, the adjusting means 49 would preferably adjust the occupant restraint assembly 20 so that the airbag 21 can be deployed at normal or full strength should deployment become necessary. It should be noted that the occupant 61 could be positioned ore forwardly, that is toward the instrument panel 11, than shown in FIG. 5. This might occur if the occupant 61 was learning forward, for example. In this case, the first and second range measurement systems 31, 32 would sense different distances and the first and second distance determining means 45, 46 would correspondingly determine that the occupant 61 was out of a normal position. In addition, the third distance determining means 47 would likely determine that the third distance L3(b) is less than the predetermined value. For these reasons, the adjusting means 49 would then preferably adjust the occupant restraint assembly 20 so that the airbag 21 could not be deployed or could be deployed according to only specific parameters.

Figure 2:
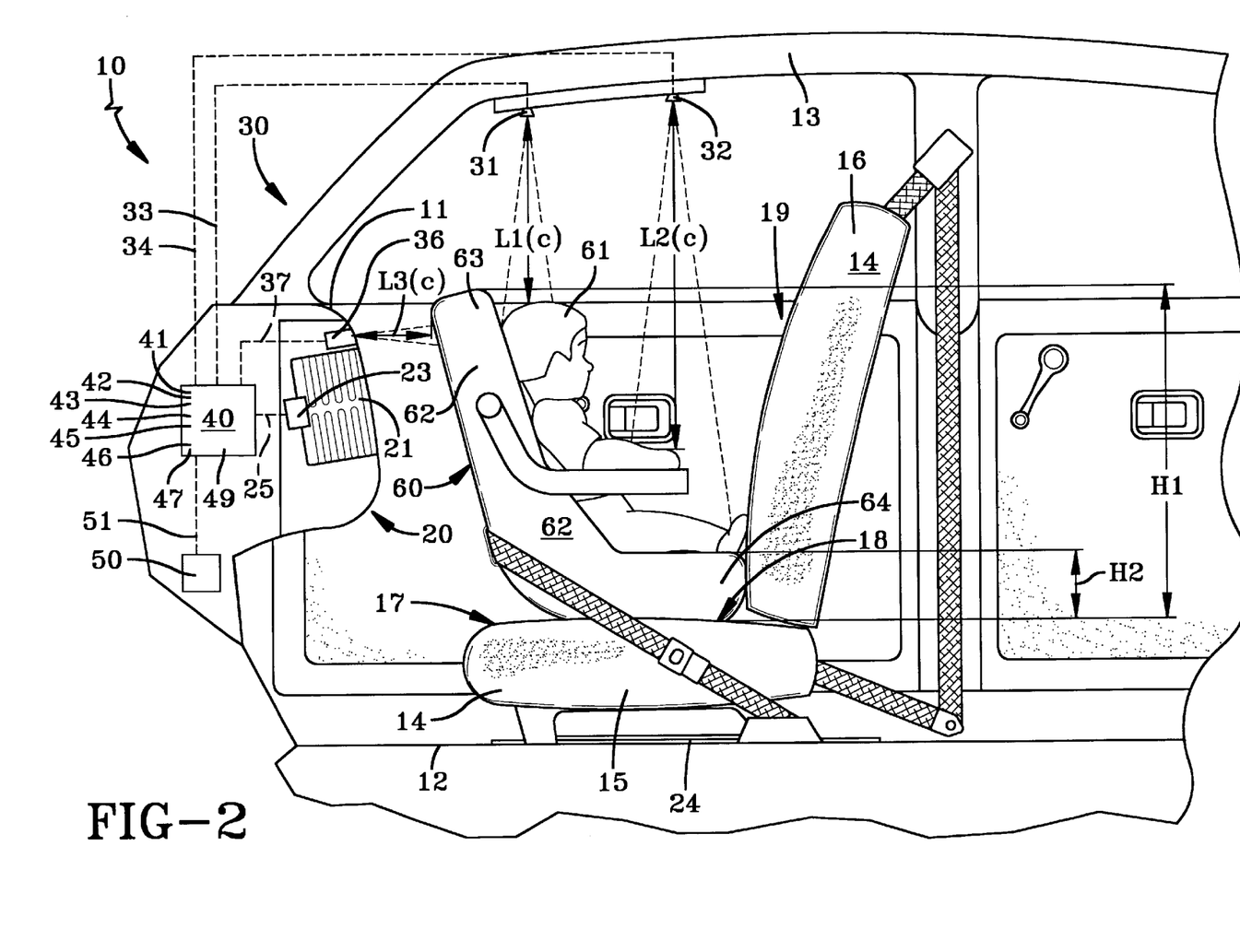
FIG. 2 is a schematic diagram similar to that shown in FIG. 1 but showing the vehicle occupant sensing apparatus of this invention with a back facing child seat on the seat of the vehicle.

With reference now to FIG. 2, the operation of the vehicle occupant sensing apparatus 30 will now be discussed in the case when an object 60 such as a child seat 62 that is back facing is positioned on the seat 14 of the vehicle 10. The child seat 62 may contain an occupant 61 that is an infant or small child. Once the vehicle 10 is started, the operating means 41 of the controller 40 causes the first, second and third range measurement systems, 31, 32, 36 to begin transmitting ultrasonic waves toward the seat 14. As the ultrasonic waves return, the first, second and third distances L1(c), L2(c), L3(c) are sensed. In this case, the third distance determining means 47 would determine that the third distance L3(c) is not less than a predetermined value. In other words, the object 60 is not too close to the instrument panel 11 for the airbag 21 to be properly deployed. The first and second distance determining means 45, 46 would determine that both the first and second distances L1(c), L2(c) are within the range of the empty seat value and the head height value. This is the condition that indicates a child seat may be present, that is the seat 14 is not empty but an adult occupant is not present. To determine if the object 60 is in fact a child seat 62 and further to determine if the child seat 62 is front or back facing, it should be noted that child seats 62 typically have first and second ends 63, 64 that have different heights. In particular for back facing child seats, such as the child seat 62 shown in FIG. 2, the first end 63 has a first height H1 that is greater than a second height H2 of the second end 64. This corresponds to the first distance L1(c) being smaller than the second distance L2(c). Thus, it is preferred that the determining means 44 of the controller 40 determine a distance ratio equal to the first distance L1 divided by the second distance L2. If the distance ratio is less than 1, the first distance L1(c) is less than the second distance L2(c) and therefore the first height H1 of the first end 63 of the child seat 62 is greater than the second height H2 of the second end 64 of the child seat 62. Thus, the child seat 62 is a back facing child seat. In this case, the adjusting means 49 would then preferably disable the inflator 23 so that the airbag 21 could not be deployed. It should be noted that it does not matter if the first range measurement system 31 senses a distance from the head of the occupant 61 or the first end 63 of the child seat 62. The same determination would be made in either case. In addition, it should be noted that if the third distance determining means 47 determines that the third distance L3(c) is less than the predetermined value the adjusting means 49 would then preferably disable the inflator 23 so that the airbag 21 could not be deployed.

With reference now to FIG. 3, the operation of the vehicle occupant sensing apparatus 30 will now be discussed in the case when an object 60 such as a child seat 62 that is front facing is positioned on the seat 14 of the vehicle 10. The child seat 62 may contain an occupant 61 that is an infant or small child. Once the vehicle 10 is started, the operating means 41 of the controller 40 causes the first, second and third range measurement systems, 31, 32, 36 to begin transmitting ultrasonic waves toward the seat 14. As the ultrasonic waves return, the first, second and third distances L1(d), L2(d), L3(d) are sensed. In this case, the third distance determining means 47 would determine that the third distance L3(c) is not less than a predetermined value. In other words, the object 60 is not too close to the instrument panel 11 for the airbag 21 to be properly deployed. The first and second distance determining means 45, 46 would determine that both the first and second distances L1(d), L2(d) are within the range of the empty seat value and the head height value. This, as noted above, is the condition that indicates a child seat may be present. To determine if the object 60 is in fact a child seat 62 and further to determine if the child seat 62 is front or back facing, it should be noted that for front facing child seats, such as the child seat 62 shown in FIG. 3, the first end 63 has a first height H1 that is less than a second height H2 of the second end 64. This corresponds to the first distance L1(d) being greater than the second distance L2(d). Thus, as noted above, it is preferred that the determining means 44 of the controller 40 determine a distance ratio equal to the first distance L1 divided by the second distance L2. If the distance ratio is greater than 1, the first distance L1(d) is greater than the second distance L2(d) and therefore the first height H1 of the first end 63 of the child seat 62 is less than the second height H2 of the second end 64 of the child seat 62. Thus, the child seat 62 is a front facing child seat. In this case, the adjusting means 49 would then preferably adjust the occupant restraint assembly 20 so that the airbag 21 would either not deploy or deploy at a reduced strength.

With reference to FIG. 5, the vehicle occupant sensing apparatus 30 will now be discussed with regard to its pulse rate of operation. In the preferred embodiment, the operating means 41 of the controller 40 includes first pulse rate operating means 42 for operating the first, second and third range measurement systems 31, 32, 36 at first pulse rates T1A, T2A, T3A respectively and second pulse rate operating means 43 for operating the first, second and third range measurement systems 31, 32, 36 at second pulse rates T1B, T2B, T3B respectively. The operating means 41 can then switch from the first pulse rate operating means 42 to the second pulse rate operating means 43 in response to the first, second and third distances L1(b), L2(b), L3(b) sensed by the first, second and third range measurement systems 31, 32, 36. Thus, for example, once the vehicle 10 is started, the first pulse rate operating means 42 of the operating means 41 may cause the first, second and third range measurement systems, 31, 32, 36 to transmit waves toward the seat 14 at a pulse rate of 30 transmissions per minute, that is T1A=T2A=T3A=30 transmissions per minute. After the determining means 44 has determined that the occupant 61 is in a normal position, it is then preferred that the operating means 41 switch to a less frequent operation. Thus, the operating means 41 may switch to the second pulse rate operating means 43 operating at second pulse rates of T1B=T2B=T3B=12 transmissions per minute. Furthermore, in the event that the crash sensor 50 detects the occurrence of a crash, the pulse rates of all the range measurement systems may be increased. By reducing the pulse rates in this way not only are the annoying clicking sounds reduced but, energy use is better managed and useful life of the range measurement systems is prolonged. Of course the actual values for the first and second pulse rates T1A, T2A, T3A, T1B, T2B, T3B can be any chosen with sound engineering judgment. It may, for example, be desirable for any or all the second pulse rates T1B, T2B, T3B to be faster than any or all of the first pulse rates T1A, T2B, T3B.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof. For example, though the vehicle occupant sensing apparatus 30 of this invention may work independently as described above, it may also be used in an overall sensing system that may include other sensing criteria such as seat belt tension, seat occupant weight, seat position and the like.

Having thus described the invention, it is now claimed:
What is claimed is:

1. A vehicle occupant sensing apparatus for use with an associated vehicle having a seat, said vehicle occupant sensing apparatus comprising:
   (1) a first range measurement system for sensing a first distance from said first range measurement system toward the first area of the seat;
   (2) a second range measurement system for sensing a second distance from said second range measurement system toward the second area of the seat;
   (3) a third range measurement system for sensing a third distance from a third range measurement system toward the third area of the seat, said first and second range measurement systems being mounted to the vehicle roof above a seat cushion portion of the seat and said third range measurement system being mounted on the instrument panel transversely of a back rest portion of the seat, said second range measurement system being located forwardly of said first range measurement system, and,
   (4) a controller, said controller including
      (a) operating means for operating said firsts, second and third range measurement systems, said first, second and third range measurement systems are ultrasonic devices, said operating means comprising: first pulse rate operating means for operating said first, second and third range measurement systems at first pulse rates T1A, T2A and T3A respectively; and, second pulse rate operating means for operating said first, second and third range measurement systems at second pulse rates T1B, T2B and T3B respectively, and (b) determining means for determining if an object is located on the seat in response to said first, second and third distances, said determining means also determining if the object is a child seat.

2. The vehicle occupant sensing apparatus of claim 1 wherein said first, second and third range measurement systems are ultrasonic devices that include a combination transmitter/receiver.

3. The vehicle occupant sensing apparatus of claim 1 wherein said first, second and third range measurement systems are ultrasonic devices that include independent transmitters and receivers.

4. The vehicle occupant sensing apparatus of claim 1 wherein said operating means selectively switches from said first pulse rate operating means to said second pulse rate operating means in response to said first, second and third distances as determined by said first pulse rate operating means.

5. A method for establishing deployment requirements for an associated airbag positioned in an instrument panel on an associated vehicle having a seat with a seat cushion portion and a back rest portion, the seat cushion portion of the seat having first and second areas and the back rest portion of the seat having a third area, said method comprising the steps of:

operating said first, second and third range measurement systems at first pulse rates T1A, T2A and T3A respectively;

sensing a first distance from a first range measurement system toward the first area of the seat;

sensing a second distance from a second range measurement system toward the second area of the seat;

sensing a third distance from a third range measurement system toward the third area of the seat;

determining that said first, second and third distances are within the range of predetermined values;

operating said first, second and third range measurement systems at second pulse rates T1A, T2B, and T3B respectively;

determining if a child seat is present; and, adjusting the deployment requirements in response to said first, second and third distances.

6. The method of claim 5 wherein, before the step of determining if a child seat is present, said method comprises the steps of:

determining if said first distance is within the range of an empty seat value and a head height value;

determining if said second distance is within the range of an empty seat value and a head height value; and, determining if said third distance is less than a predetermined value.

* * * * *